United States Patent [19]

Chiu

[11] Patent Number: 5,667,307
[45] Date of Patent: Sep. 16, 1997

US005667307A

[54] ARTICLE HOLDING BAG OF NON-WOVEN FABRIC AND A METHOD FOR MAKING THE SAME

[76] Inventor: Hua Tsung Chiu, Fl. 1, No. 8, Alley 21, Lane 239, Section 2, PA-TE Road, Pan-Chiao City Taipei Hsien, Taiwan

[21] Appl. No.: 617,442

[22] Filed: Mar. 18, 1996

[51] Int. Cl.$^6$ ................................................. B65H 69/08
[52] U.S. Cl. .................. 383/107; 156/275.3; 156/274.8; 156/275.7; 156/331.7; 428/36.4
[58] Field of Search ........................... 156/272.2, 274.4, 156/274.8, 275.1, 275.3, 275.5, 275.7, 331.7, 331.1, 273.7, 331.4, 77, 88; 383/107; 428/36.1, 36.4, 245, 289, 290; 524/501, 507; 525/127

[56] References Cited

U.S. PATENT DOCUMENTS

| | | | |
|---|---|---|---|
| 4,053,546 | 10/1977 | Yomasaki et al. | 156/77 |
| 4,410,575 | 10/1983 | Obayashi et al. | 156/272.2 |
| 4,609,690 | 9/1986 | Gruber et al. | 524/507 |
| 4,728,566 | 3/1988 | Lancaster et al. | 156/272.2 |

*Primary Examiner*—Michael W. Ball
*Assistant Examiner*—Michael A. Tolin
*Attorney, Agent, or Firm*—Bacon & Thomas

[57] ABSTRACT

A method for making an article holding bag of a non-woven fabric material involves impregnating the non-woven fabric material in an aqueous solution containing 25–80% by weight of water and 75–20% by weight of a resin mixture composed of polyacrylic acid and polyurethane in a weight ratio ranging between 2:1 and 1:4. Thereafter, the impregnated non-woven fabric is removed and dried by baking. The dried non-woven fabric is laminated and is then subject to a high frequency plastic welding to make the article holding bag.

6 Claims, No Drawings

ARTICLE HOLDING BAG OF NON-WOVEN FABRIC AND A METHOD FOR MAKING THE SAME

FIELD OF THE INVENTION

The present invention relates generally to an article holding bag and a method for making the article holding bag, and more particularly to an article holding bag made of a non-woven fabric material and a method for making the same.

BACKGROUND OF THE INVENTION

The method for making the conventional compact disk bags of polyvinyl chloride (PVC) is defective in design in that it is not cost-effective, and that the PVC bags are potential pollutants. As a result, PVC is replaced by polypropylene (PP). The bags made of PP must be finished by sewing which is not cost-effective, or by ultrasonic pressing which undermines the esthetic effect of the bags by causing the bags to have hairy sides.

SUMMARY OF THE INVENTION

It is therefore the primary objective of the present invention to provide an article holding bag made of a non-woven fabric material by high frequency plastic welding.

It is another objective of the present invention to provide a high frequency plastic welding method for making an article holding bag of a non-woven fabric material.

It is still another objective of the present invention to provide an article holding bag made of a non-woven fabric material by high frequency plastic welding, wherein the non-woven fabric material is impregnated with an aqueous solution containing polyacrylic acid and polyurethane before it is used to make the article holding bag by the high frequency plastic welding.

It is still another objective of the present invention to provide a high frequency plastic welding method for making an article holding bag of a non-woven fabric material which is first impregnated with an aqueous solution containing polyacrylic acid and polyurethane.

The method of the present invention comprises the steps, which are described explicitly hereinafter.

The first step involves impregnating a non-woven fabric material in an aqueous solution containing polyacrylic acid and polyurethane dissolving therein. The aqueous solution contains 25–80% by weight of water and 75–20% by weight of a resin mixture which is composed of polyacrylic acid and polyurethane in a weight ratio ranging between 2:1 and 1:4.

The non-woven fabric material impregnated with the aqueous solution is then dried by baking.

The final step of the method of the present invention involves forming an article holding bag by high frequency plastic welding a two-layer laminate of the baked non-woven fabric material.

The non-woven fabric material referred to in the method of the present invention includes any conventional non-woven fabric material, except the PVC non-woven fabric material. To be more specific, the conventional non-woven fabric materials, such as PP non-woven fabric material, synthetic cotton non-woven fabric material, synthetic cotton/polyester (PE) mixed non-woven fabric material, etc., may be used in the method of the present invention.

The polyacrylic acid may be replaced with a copolymer containing acrylic acid monomer as its main polymeric unit.

The polyurethane may be replaced with a copolymer containing the polyurethane as its backbone or main polymeric sector.

The aqueous solution of the method of the present invention contains 25–80% by weight, preferably 30–70% by weight, of water and 75–20% by weight, preferably 70–30% by weight, of a resin mixture which is composed of polyacrylic acid and polyurethane in a weight ratio ranging between 2:1 and 1:4, preferably between 1:1 and 1:3. The article holding bags made of a non-woven fabric material impregnated with the aqueous solution in a weight ratio greater than 2:1 are prone to give a bag handler a gluey touch. On the other hand, if the weight ratio of polyacrylic acid and polyurethane is smaller than 1:3, the control temperature of the high frequency plastic welding must be raised up to 140° C. The structural integrity of the non-woven fabric material is seriously undermined at a temperature as high as 140° C.

The aqueous solution of the method of the present invention may contain a minute amount of additives such as a stabilizer, filler and pigment. These additives are well known in the art and, for example, triphenyl phosphite and 2-ethylhexyl diphenyl phosphate are recommended to be used as a stabilizer respectively in pp. 465–466 and pp. 622–624 of ENCYCLOPEDIA OF CHEMICAL TECHNOLOGY, 3rd edition, edited by Kirk-Othmer.

The drying step of the method of the present invention is carried out by baking the impregnated non-woven fabric material with a temperature higher than 50° C., preferably between 60° C. and 100° C.

The high frequency plastic welding step of the method of the present invention is done by a high frequency welding machine having a power of 30 KVA, a frequency of 40.68 MHz and a pressing temperature range of 100°–120° C. These operational conditions are subject to be changed depending on the properties of the aqueous solution and the non-woven fabric material.

It must be noted here that this inventor of the present invention is the first one to have employed successfully the high frequency plastic welding technique in making article holding bags of PP non-woven fabric material. U.S. Pat. No. 5,409,761 discloses a method in which a PP microporous thermoplastic film and a non-woven fabric of a thermoplastic material are laminated by hot pressing. U.S. Pat. No. 5,368,927 discloses a method in which a non-woven fabric material is laminated with a film of a polymer blend containing PP, PE-PP copolymer and PE-αPE copolymer. In practice, a layer of PP non-woven fabric material can not be laminated with another layer of PP non-woven fabric material by means of a high frequency plastic welding. For this reason, this inventor of the present invention discloses a method in which a non-woven fabric material is impregnated with an aqueous solution containing specific resins so as to facilitate the production of an article holding bag of a non-woven fabric material by high frequency plastic welding.

The article holding bag of a non-woven fabric of the present invention is made in accordance with the steps, which are described explicitly in sequence hereinafter.

The first step involves the impregnation of a non-woven fabric material in an aqueous solution containing a resin mixture composed of polyacrylic acid and polyurethane. The aqueous solution contains 25–80% by weight of water and 75–20% by weight of the resin mixture which is composed of polyacrylic acid and polyurethane in a weight ratio ranging between 2:1 and 1:4.

The non-woven fabric material impregnated with the aqueous solution is then dried by baking.

The final step involves forming an article holding bag by high frequency plastic welding a two-layer laminate of the baked non-woven fabric material.

For more details of the non-woven fabric, the aqueous solution, polyacrylic acid, polyurethane, the baking process, and the high frequency plastic welding machine, please refer to the preceding sections in which the method of the present invention was expounded.

The present invention will be more readily understood upon a thoughtful deliberation of the following detailed description of two preferred embodiments of the present invention.

DETAILED DESCRIPTION OF THE EMBODIMENTS

The first preferred embodiment of the present invention comprises a first step in which an aqueous solution containing 50% by weight of water and 50% by weight of a resin mixture is prepared. The resin mixture is composed of polyacrylic acid (sold under a code name of TCU-331 by Tai-Chang Resin Co., Ltd., Taiwan) and polyurethane (sold under a code name of NANTEX 758 by Nantex Chemicals Co., Ltd., Taiwan) in a weight ratio of 2:1. A PP non-woven fabric material (sold under a code name of 50 G by Kaoshang Co., Ltd., Taiwan) was impregnated in the aqueous solution for several minutes. Thereafter, the impregnated non-woven fabric material was removed and dried by baking at a temperature of 70° C. in conjunction with three 3-horsepower industrial fans for accelerating the evaporation of the aqueous solution. Finally, a CD bag of the PP non-woven fabric material was made in accordance with the product specifications by using a high frequency plastic welding machine having a power of 30 KVA, a frequency of 40.68 MHz and a pressing temperature of about 105° C. The high frequency plastic welding machine is manufactured and sold under the product code of JYHP-2015 by Tzu Yee Company, Taiwan.

The second preferred embodiment of the present invention is similar to the first preferred embodiment described above, except that the former uses an aqueous solution containing a resin mixture of polyacrylic acid and polyurethane in the weight ratio of 3:1, and that the former carries out the high frequency plastic welding at about 120° C.

The embodiments of the present invention described above are to be regarded in all respects as being merely illustrative an not restrictive. Accordingly, the present invention may be embodied in other specific forms without deviating from the spirit thereof. The present invention is therefore to be limited only by the scopes of the following appended claims.

What is claimed is:

1. A method of making an article holding bag of a non-woven fabric material, said method comprising the steps of:
   (a) preparing an aqueous solution containing 25–80% by weight of water and 75–20% by weight of a resin mixture composed of polyacrylic acid and polyurethane in a weight ratio ranging between 2:1 and 1:4;
   (b) impregnating a non-woven fabric material in said aqueous solution;
   (c) removing the impregnated non-woven fabric material from said aqueous solution and then drying said impregnated non-woven fabric material by baking; and
   (d) forming an article holding bag by high frequency plastic welding a two-layer laminate of the dried non-woven fabric material.

2. The method as defined in claim 1, wherein said aqueous solution contains 30–70% by weight of water.

3. The method as defined in claim 1, wherein said resin mixture is composed of polyacrylic acid and polyurethane in a weight ratio ranging between 1:1 and 1:3.

4. The method as defined in claim 1, wherein said high frequency plastic welding is carried out at a temperature ranging between 100° and 120° C.

5. The method as defined in claim 3, wherein said high frequency welding is carried out at a temperature ranging between 100° and 120° C.

6. An article holding bag of a non-woven fabric material which is made in accordance with the method of claim 1.

* * * * *